Nov. 17, 1931.   D McR. LIVINGSTON   1,831,814
AUTOMOBILE SIGNAL
Original Filed May 5, 1922   4 Sheets-Sheet 1
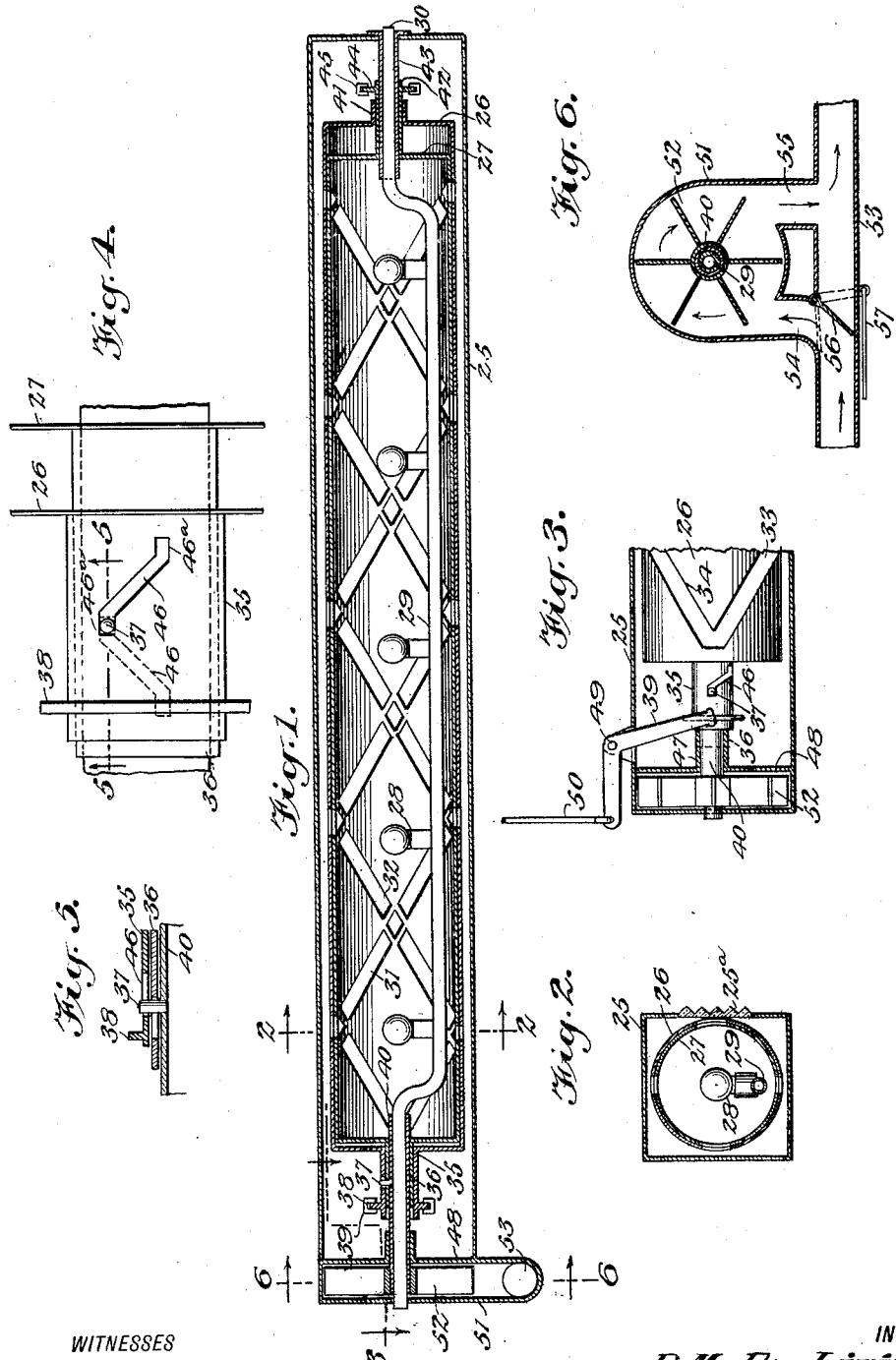
WITNESSES
INVENTOR
D McRa Livingston
BY
ATTORNEYS

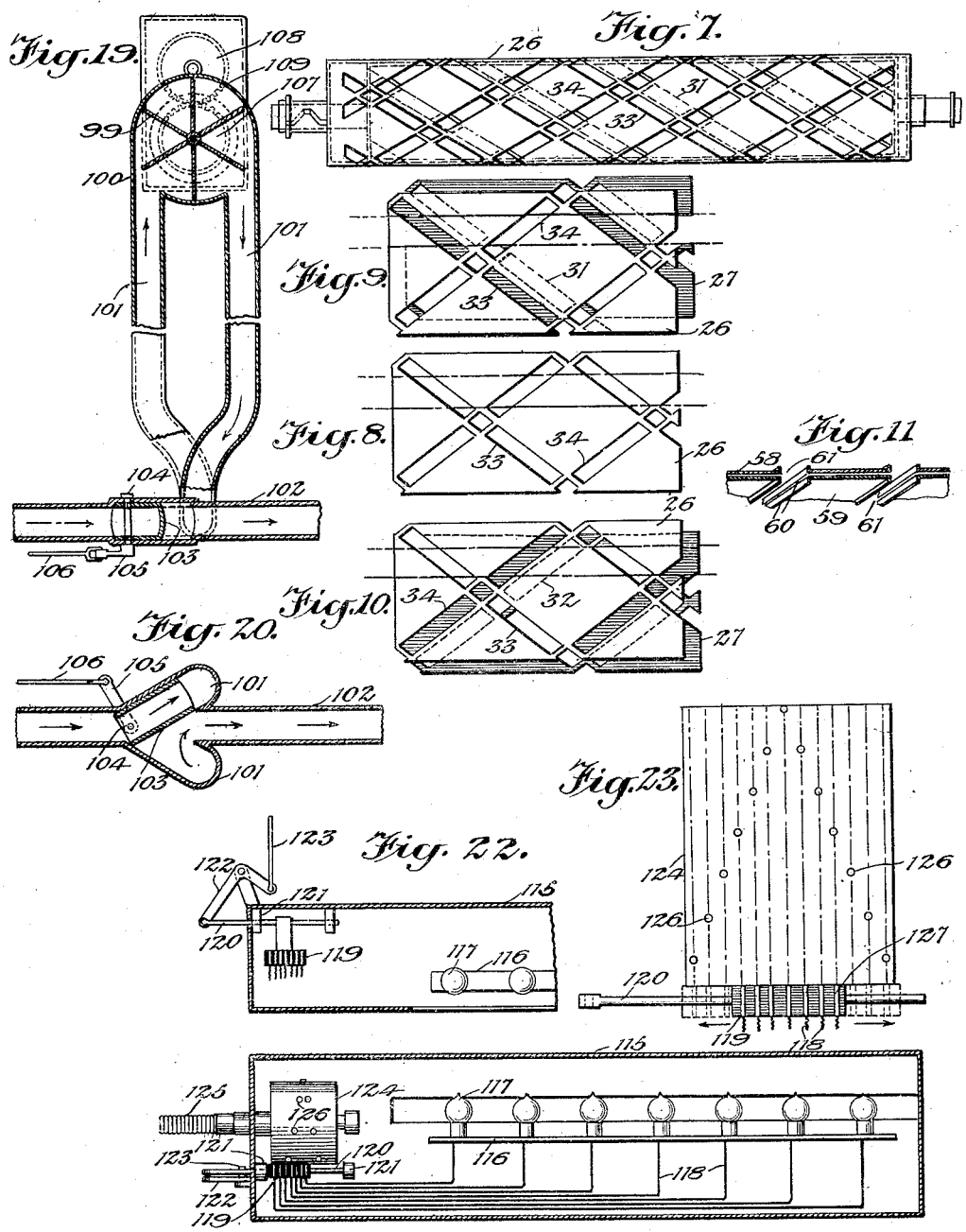

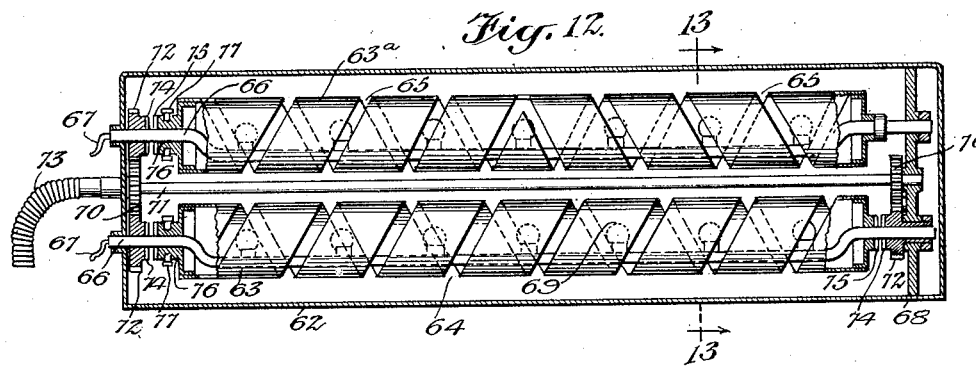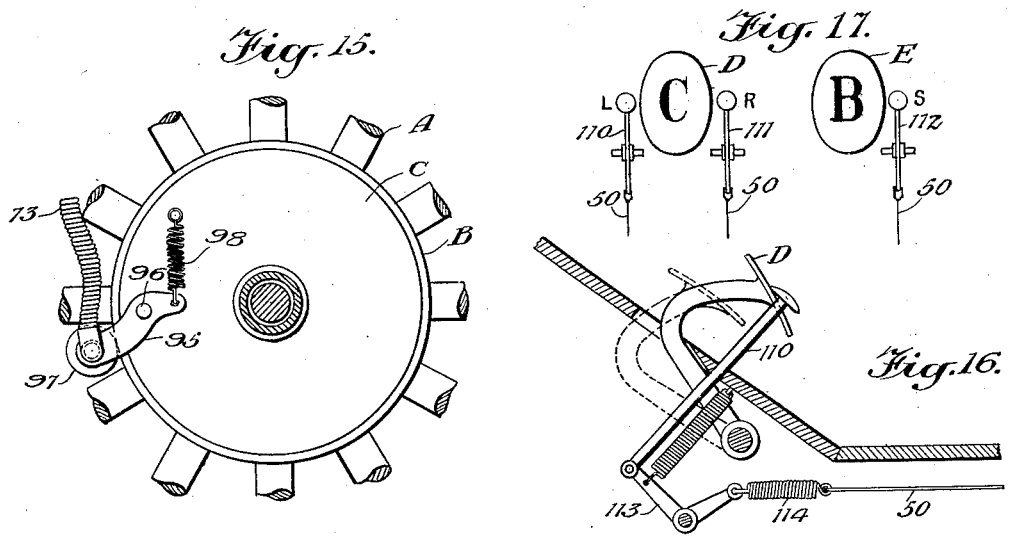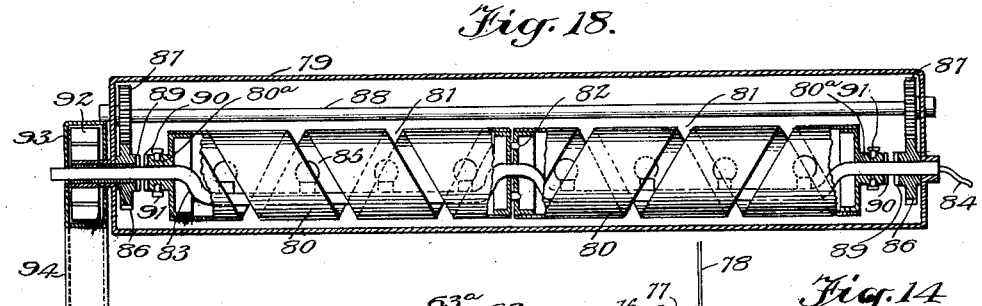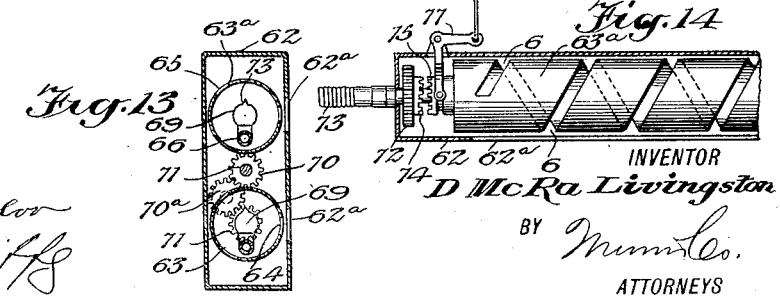

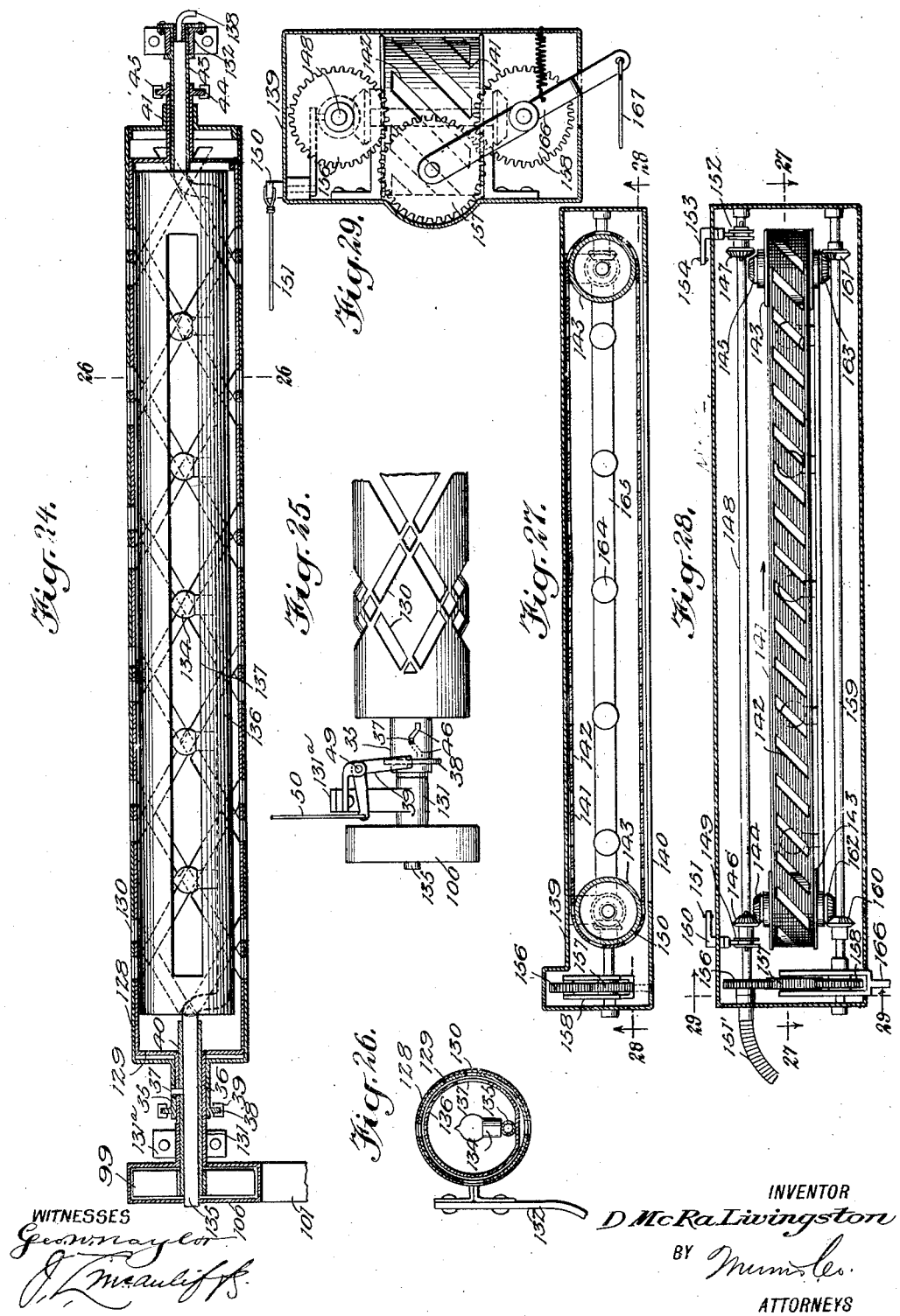

Patented Nov. 17, 1931

1,831,814

UNITED STATES PATENT OFFICE

D McRA LIVINGSTON, OF NEW YORK, N. Y.

AUTOMOBILE SIGNAL

Application filed May 5, 1922, Serial No. 558,840. Renewed November 24, 1925.

My invention relates to signals for automobiles and other vehicles and more particularly has reference to means to signal that the vehicle is about to stop or about to turn to the right or left.

An important object of the invention is to provide a signal of the indicated type embodying means to give emitted light the effect of a shifting directional signal light, a further object being to provide for controlling the elements of the signal whereby light effects will be produced of a character to constitute a non-directional or stop signal or a direction signal as may be desired.

A further object of the invention is to provide a signal of the indicated type of such a character that signal elements will variably appear to give the effect of longitudinal movement of the signal elements and to provide controlling means to reverse the direction of the apparent longitudinal movement.

Reference is to be had to the accompanying drawings forming a part of this specification, it being understood that the drawings are merely illustrative of practical examples of the invention.

Figure 1 is a longitudinal sectional view of a signal embodying my invention;

Figure 2 is a cross section on the line 2—2, Figure 1;

Figure 3 is a fragmentary section as indicated by the line 3—3, Figure 1;

Figure 4 is a fragmentary side elevation showing related elements functioning to give relative movement to the inner and outer cylinders;

Figure 5 is a section on the line 5—5, Figure 4;

Figure 6 is a cross section on the line 6—6, Figure 1;

Figure 7 is a side elevation of the cylinder assemblage in one adjustment of the cylinders;

Figures 8, 9 and 10 are schematic views given to indicate the relative positions of the inner and outer cylinders when arranged to give a stop signal, a right signal and a left signal, respectively;

Figure 11 is a fragmentary longitudinal section showing a slightly modified arrangement of the cylinders;

Figure 12 is a side elevation of a modified arrangement of the cylinders;

Figure 13 is a cross section on the line 13—13, Figure 12;

Figure 14 is a sectional plan view at one end of the assemblage shown in Figures 12 and 13;

Figure 15 is a fragmentary cross sectional view indicating one drive means that may be employed, said drive means being shown adapted to the assemblage of Figures 12 to 14;

Figure 16 is a vertical section of pedal-operated means for operating certain pull wires or cables to be hereinafter referred to;

Figure 17 is a diagrammatic plan view of the pedal assemblage of Figure 16;

Figure 18 is a further modification of the cylinder assemblage;

Figure 19 is a transverse vertical section showing a modification of the drive means;

Figure 20 is a vertical section showing the valve arrangement for the drive means of Figure 19;

Figure 21 is a partly sectional side elevation of a modification in which the illuminating means is employed instead of the cylinders to give the shifting light effects;

Figure 22 is a fragmentary sectional view of the assemblage shown in Figure 21 but at right angles to said figure, the commutator cylinder being omitted;

Figure 23 is a schematic view of the commutator and collector employed in the form of the invention shown in Figures 21 and 22;

Figure 24 is a view similar to Figure 1 illustrating a construction in which the revolving cylinders are at the exterior;

Figure 25 is an elevation of one end of the signal shown in Figure 24;

Figure 26 is a cross section as indicated by the line 26—26, Figure 24;

Figure 27 is a horizontal section as indicated by the line 27—27, Figure 28, showing a further modification in which a travelling belt is employed having the signal means in the form of oblique slots;

Figure 28 is a vertical section as indicated by the line 28—28, Figure 27;

Figure 29 is a transverse section as indicated by the line 29—29, Figure 28.

Referring at first more particularly to the assemblage illustrated in Figures 1 to 10 my signal device includes a casing 25 having an elongated light emitting opening 25a at the front thereof. Within the casing 25 is a cylinder 26 and a separate inner cylinder 27. A source of light is provided within the inner cylinder, there being shown conventionally electric lamps 28 supported on a tube 29 disposed within the inner cylinder and extending to the ends of the casing 25, said tube being adapted to receive in the form of the invention shown a conductor cable 30 to supply the lamps 28.

The inner cylinder has spiral light-emitting slots 31 and reversely arranged spiral light-emitting slots 32, said slots being adapted to register respectively with reversely disposed spiral light-emitting slots 33, 34 in the outer cylinder 26 so that a light beam may be produced through the opening 25a in casing 25.

On the outer cylinder 26 at one end and axially thereof is a tubular extension 35 of reduced diameter, a similar tubular extension 36 being provided on the inner cylinder 27 within the extension 35. A pin 37 projects laterally from the sleeve 40 through which sleeve the adjacent end of the tube 29 extends. The projection 37 extends through the opposite generally oblique slots 46 in tubular extension 36 of the inner cylinder 27 and outer tubular extension 35. On the extension 35 is an annular flange 38 engaged by a shifting lever 39 for sliding the cylinder 26 and its extension 35 axially of the cylinder 27 and its extension 36. At the same time the longitudinal movement of the extension 35 will, by reason of the obliquity of the slots 46 and the engagement of the pin 37 cause a turning movement of the outer cylinder 26 relatively to the inner cylinder 27. At the ends the oblique slots 46 have longitudinal extensions deflected on lines parallel with the axis of the cylinders so that the pin 37 will drive the cylinder 26 as well as the cylinder 27 with the turning of the sleeve 40 when driven as hereinafter referred to but without producing any relative turning or sliding of the cylinders 26, 27. The sleeve 40 extends through a boss 47 on a partition 48 of casing 25. The bellcrank lever 39 is shown as fulcrumed as at 49 on an element rigid with the casing 25 and is adapted to be rocked by a pull wire or cable 50 extending in practice to within reach of the operator of the vehicle.

As one drive means for the light emitting cylinders 26, 27 I have shown a fan casing 51 on the main casing 25 at one end and enclosing a propeller fan 52, the hub of which is fast on the sleeve 40. The casing 51 communicates with the exhaust line 53 of the motor on the vehicle on which the signal is emplaced. A passage 54 leads from the line 53 to the casing 52 and a return passage 55 is provided from casing 52 to the line 53 whereby the fan casing constitutes a by-pass into which the exhaust products may be directed through the medium of an optionally operable valve 56 that may be rocked by a rod 57 extending in practice to any convenient point of reach by the operator of the vehicle.

With the described arrangement the reverse spiral disposition of the slots 31, 32 and 33, 34 may be so adjusted and controlled that a stop signal may be given, or a right or a left direction signal. Thus, if the slots 31, 32 are in register with the slots 33, 34 light rays will pass through said slots and beams will be emitted through the opening 25a in the casing 25 to both the right and left and by reason of the rotation of the cylinders 26, 27 in unison, the movement of the spiral slots past the opening 25a will result in a shifting of the right and left light beams but without disturbing the essential continuity of the beams. On the other hand if the outer cylinder 26 be shifted through the medium of the described features 37, 38, 39, 40, the slots 31 of the inner cylinder will be out of register with the slots 33 of corresponding direction in the outer cylinder 26 and similarly the opposite slots 32 of the inner cylinder 27 will be in register with the corresponding slots 34 in the outer cylinder 26 so that only the right hand spiral slots will pass light through the opening 25a and shifting beams apparently moving to the right will result, the shifting serving to effectively attract attention while the direction of movement of the light beams will indicate the direction.

In a similar manner a turning to the left may be indicated by the reverse shifting of the cylinders 26, 27 so that only the slots 31 and 33 will register. For a stop signal, both the right and left spiral slots of the respective cylinders 26, 27 will be brought into register so that the apparent shifting of the light beams will produce a to and fro or waving light effect or apparent motion. Thus, the same assemblage serves to give a stop signal or a signal to the right or to the left due to the control of the light-emitting means.

In practice, the opening 25a has a prismatic glass 25b as shown in Figure 6, said glass being omitted from other figures in the interest of clearness. The use of the prismatic glass intensifies the light effects and is particularly advantageous in daylight to give increased visibility to the signalling.

Figure 11 illustrates a slight modification in the form of the cylinders. At the spiral slots 61 of the respective cylinders 58, 59 corresponding with the cylinders 26, 27 flanges 60 are produced on the material of the cylinders at the slots for strengthening the cylinders.

In the form shown in Figures 12 to 14 a casing 62 is provided having light-emitting slots 62a and within said casing adjacent said slots two separate cylinders 63 are mounted, one above another. One cylinder 63 has a continuous spiral 64 running throughout the length of the cylinder and the other cylinder 63a has spirals 65 running in reverse directions from the center toward opposite ends. The cylinder 63 serves to function as a direction signal since by turning the same in one direction the light effects will appear to shift from left to right and the turning of said cylinder in the opposite direction will cause the emitted light to appear as shifting from right to left. The other cylinder 63a serves to function as a stop signal because the reverse light-emitting spirals 65 emanating from the center and running toward the opposite ends will produce non-directional light beams at opposite sides of the center and apparently moving from the ends toward the center or from the center toward the ends.

Extending longitudinally of the cylinders 63, 63a are tubular elements 66 for the conductors 67, said elements being supported at one end in an end of the casing 62 and supported adjacent the opposite end of the casing by a partition 68. The conductors 67 feed a longitudinal series of lamps 69 within the cylinders 63.

For turning the cylinders 63, 63a drive pinions 70 on a drive shaft 71 mesh with pinions 72 concentric with the conductor tubes 66, said shaft 71 being driven in any suitable manner, there being indicated a flexible shaft section 73. The pinions 72 are provided for each cylinder 63, 63a at one end of said cylinders, whereas at the opposite end only one cylinder (63) has associated therewith a pinion 72. On the pinions 72 are clutch elements 74 and mating clutch elements 75 are provided on the end hubs 76 of each cylinder 63, 63a the clutches being provided for both cylinders at one end and for one cylinder only at the opposite end. The said hubs 76 provided at one end of each cylinder 63, 63a are grooved to receive clutch levers 77 operated by a cable 78 or the like. The clutch lever 77 controlling the cylinder 63a at one end serves to throw said cylinder into or out of driving engagement with the adjacent pinion 72. The same operation is performed with the clutch lever 77 of the other cylinder 63 for turning said latter cylinder in one direction, the clutching of the opposite end of the cylinder 63 serving to give reverse movement to said cylinder.

In Figure 18 the casing 79 is equipped with a pair of light emitting cylinders 80 disposed end to end and having reverse spirals 81. At the opposed ends of the cylinders one of the same has clutch pins 82 or equivalent clutching means to engage the other cylinder 80 for causing the cylinders to turn as one or permitting the cylinders to be separated for independent turning.

If the cylinders turn in unison they will function as a stop signal since the reverse spirals will result in beams being continuously moved from center to ends or vice versa. A tubular element 83 extends continuously through the cylinders 80 and receives a conductor 84 to supply the lamps 85 supported on the element 83. Concentric with the element 83 I provide pinions 86 meshing with pinions 87 on a drive shaft 88. Mating clutch elements 89, 90 are provided respectively on the pinions 86 and on the end hubs 80a of the cylinders 80 and controlled by clutch levers 91.

The hub of one pinion 89 is driven in the illustrated example by a fan wheel 92, the casing 93 of which is in communication with the exhaust line 94 as for example in the manner explained in connection with the form shown in Figures 1 to 6. In use the assemblage of Figure 18 is adapted to have the clutch pins 82 engaged or disengaged through the operation of the clutch levers 91, the action of the clutch levers at the same time throwing one cylinder 80 or the other into driving connection with the adjacent drive pinion 87. The driving of the flexible shaft section 73 may as indicated in Figure 15 be effected through the medium of a revolving part pertaining to the vehicle. In said figure a fragment of a rear wheel A is indicated, B indicating a brake drum associated with said wheel, and C indicating a flange for example on the axle housing. A lever 95 is shown as fulcrumed at 96 on the flange C and carries at one end a frictional drive roller 97 to engage in contact with the drum B, the opposite end of said lever being under the tension of a spring 98 to maintain the driving contact of pinion 97.

The propeller fan arrangement illustrated in Figures 1, 3 and 6, in which the fan is designated as 52, may be modified to utilize the exhaust, the modification being adapted also as a substitute for the propeller fan 92. Said modified propeller fan assemblage is shown in Figures 19 and 20 in which the fan 99 is mounted in a casing 100 having passages 101 adapted to communicate with the exhaust line 102, the communication being controlled by a tubular valve 103. Said valve is mounted on a rock shaft 104 having a crank arm 105 adapted to be operated by a wire or cable 106. The valve 103 may be positioned to direct the exhaust to the propeller fan 99 upwardly through either passage 101 and return through the other passage 101 or in the reverse order for reversing the direction of turning of the propeller fan 99. Any suitable drive connection may be established between the shaft of the propeller fan 99 and light-emitting cylinders conventionally indicated in dotted lines at 107, 108, there being shown intermeshing pinions 109 for the purpose of effecting the drive.

In Figures 16 and 17 there is illustrated an assemblage of pedal-operated means for exerting a pull on the wire or cable 50, for example, or 106 or 123, hereinafter mentioned. In said figures the letter D indicates the usual clutch pedal of the automobile and E the brake pedal. At opposite sides of the clutch pedal adjacent thereto are pedals 110, 111 for right or left signalling. The said pedals 110, 111 are sufficiently close to the main clutch pedal D that the foot of the operator may depress either the left or the right pedal 110 or 111 with the depression of the clutch pedal D. The pedals 110, 111 are shown as operating through a spring acted bellcrank 113 secured through the medium of a spring 114 with the wire cable 50. Similarly, means is employed at one side of the brake pedal E to operate the stop signal there being a pedal 112 corresponding with the pedals 110, 111 and having suitable connection with the particular wire or cable 50.

In Figures 21 to 23 I have illustrated an assemblage wherein the changes in the illuminating means give a changing light effect for directional signalling, the control of the illuminating means being arranged also to give a stop signal, the light emitting means in this case being the stationary case 115. Within the case 115 is a series of lamps 117 on a suitable support 116 from which lamps the conductor wires 118 lead to a collector 119 operating in connection with a commutator 124. Said collector is mounted on an axially slidable rod 120 operating through a bearing 121, said rod being connected with a bellcrank lever 122 operated by a pull wire or cable 123 similar to the wires or cables 50, 78. The commutator shaft is driven in any suitable manner, there being a section of a flexible shaft 125 adapted to be operated from any convenient source. The commutator 124 is equipped with series of contacts 126 disposed along convergent lines and the collector 119 has a series of contacts 127. The shifting of the collector 119 will bring different contacts 127 to selected contacts 126 and the contacts 127 in wiping over the contacts 126 will illuminate the lamps 117 in succession in a given direction depending on the sequence in which the contacts 127 are engaged.

When both series of contacts 127 are engaged by contacts 126 the signal will display the lighted lamps and waving light effects in such manner that the illumination will have the character of a non-directional stop signal.

In the several forms referred to are light-emitting means and an illuminating means together with controlling means for one of the same to give the shifting light effects for directional signalling.

In the form shown in Figures 24 to 26, cylinders 128, 129, one within another, are provided, said outer cylinder forming the exterior of the signal. Said signal has reverse oblique slots 130, the same as the form shown in Figure 1 and these slots need not therefore be further described. The cylinders 128, 129 are adapted to be driven by the means shown in Figures 19 and 20 and accordingly parts bear reference numbers to identify them with the similar parts in Figures 19 and 20. Also, the means for moving the cylinders 128, 129 longitudinally and turnably relatively to each other corresponds with the similar means in Figure 1 and corresponding reference characters 35 to 40 and 46, 46a, 49 and 50 have been employed in said Figures 24 and 25 to identify the certain parts with the same parts in Figure 1. The hub or base 131 of the fan casing 100, in Figures 24 and 25, support a bracket 131a on which the bellcrank lever 39 is fulcrumed. At the opposite end the sleeve 43 corresponding with the same sleeve in Figure 1 is supported in a bracket bearing 132. To illuminate the signal in Figures 24 to 26 lamps 134 are mounted on a rigid tubular support 135 disposed longitudinally in the fixed shell 136 within the inner cylinder 129, said shell 136 having a longitudinal light-emitting slot 137 across which the signal slots 131 move with the turning of the cylinder. The numeral 138 indicates the conductor running into the tubular support 135 to supply the lamps 134. The turning of the shells 128, 129 through the fan 99 and sleeve 40 will cause the slots 130 to move past the slot 137 for signalling in the same manner as described in connection with the form shown in Figure 1.

In the form shown in Figures 27 to 29, a fixed casing 139 has a longitudinal light-emitting slot 140 and within said casing is a travelling belt 141 formed with vertical or oblique signal slots 142, the said belt running about drums 143. On one end of the shaft of each drum 143 are bevel pinions designated respectively 144, 145 and similar bevel pinions 146, 147 are provided on a drive shaft 148 driven in any suitable manner, there being shown a short section of flexible drive shaft 151'. On the hub of the pinion 146 is a grooved collar 149 receiving a shifting lever 150 adapted to be operated by a pull wire 151. Similarly, at the opposite end of the shaft 145 the hub of the bevel pinion 147 has a grooved collar 152 engaged by a shift lever 153 adapted to be actuated by a pull wire or cable 154. Either pinion 146 or 147 may be shifted along the shaft 148 to establish driving connection with either of the drum pinions 144, 145 or said pinions 146, 147 may be moved to neutral position so that both are out of engagement with the pinions 144, 145. By throwing the pinion 146 into mesh the belt 141 will be turned in one direction as for example signalling a turning to the right, or the pinion 147 may be thrown into engagement to move the belt for signalling a turning to the left. In order to vibrate the belt 141 back and forth for non-directional signalling, the drive shaft 148 has a pinion 156 and a shaft 159 is provided having a pinion 158. Between the pinions 156 and 158 is an intermediate pinion 157 carried by a forked lever 166, the fulcrum of which is on the shaft 159, said lever being adapted to be rocked by a pull wire 167 for throwing the pinion 157 into mesh with the pinions 156, 158 and thereby driving the shaft 159. On said shaft 159 at one end is a mutilated bevel pinion 160 and at the opposite end of said shaft 159 is a mutilated bevel pinion 161, said mutilated pinions being adapted to mesh respectively with bevel pinions 162, 163 on the respective shafts of the drums 143. With the pinion 157 in mesh with the pinions 156, 158 the shaft 159 will be turned continuously in one direction but by reason of the mutilated pinions 160, 161 the drums 143 will be alternately turned and in opposite directions to give a vibrating back and forth movement to the belt 141 for giving a non-directional stop signal.

I would state in conclusion that while the illustrated examples constitute practical embodiments of my invention, I do not limit myself strictly to the exact details herein illustrated, since, manifestly, the same can be considerably varied without departure from the spirit of the invention as defined in the appended claims.

Having thus described my invention, I claim:—

1. A signal for preindicating a turning movement of a vehicle or the like to the right or left, comprising a housing, lighting means within said housing, the illumination of the housing being viewable from the light outside, and means for cutting the rays so as to produce the effect of light moving in one or the other direction, comprising coaxial cylinders encircling the source of said light rays and formed with opposed spiral light-emitting slots, and means for holding the cylinders in co-relative positions to expose one or the other of said spiral slots to the passage of light.

2. A signal for preindicating a turning movement of a vehicle or the like to the right or left comprising a housing, means for illuminating the interior of said housing, the illumination being viewable from the outside, means for cutting the rays of light producing the illumination to obtain the effect of light moving in one or the other direction, comprising coaxial cylinders encircling the source of said light rays and formed with opposed spiral light-emitting slots and means for holding the cylinders in co-relative positions to expose one or the other of said spiral slots to the passage of light, said holding means being also capable of holding the cylinders to expose simultaneously both spirals to obtain the effect of light moving simultaneously in both directions, for indicating a stop signal.

3. A signal for preindicating a turning movement of a vehicle, comprising a housing provided with an oblong window, means for illuminating said housing enclosed therein, means adapted to cooperate with said housing and said illuminating means to produce an apparent continuous motion of light across said window, and means for functioning said cooperating means with the illuminating means to give a turn indication.

4. A signal for preindicating a turning movement of a vehicle to the right or left, comprising a housing having an oblong translucent window associated therewith, the longer sides of said window being continuously parallel to the roadbed upon which the vehicle is operating, means for illuminating said housing enclosed therein, means adapted to cooperate with the housing and said illuminating means, effective to produce an apparent continuous motion of light across said window, to the right or left, as may be predetermined, and means for functioning said cooperating means with said illuminating means to preindicate a turning movement of the vehicle.

5. A signal for preindicating a turning movement of a vehicle, comprising a housing having an oblong window therein, means for illuminating said housing enclosed therein, shutter mechanism cooperating with the housing and said illuminating means, effective to produce an apparent continuous motion of light across said window, and means for causing the functioning of said shutter mechanism with said illuminating means to preindicate a turn to be executed by a vehicle.

6. A signal for preindicating a turning movement of a vehicle to the right or left, comprising a housing having an oblong window therein, the longer sides of said window being continuously parallel to the roadbed upon which the vehicle is operating, means for illuminating said housing enclosed therein, revoluble shutter mechanism adapted to cooperate with said housing and said illuminating means to produce an apparent continuous motion of light across said window, in either of two directions, and means for causing said shutter mechanism to function with the illuminating means for producing an apparent continuous movement of light in that direction which corresponds to the direction in which a vehicle turn is to be executed.

7. A signal for preindicating a turning movement of a vehicle to the right or left, comprising a housing embodying fixed light-emitting means of an oblong outline, means for supporting said housing to continuously maintain the longer sides of said light-emitting means parallel to the roadway upon which vehicular traffic is operating, means for electrically illuminating said housing enclosed therein, and means associated with said illuminating means selectively operable to produce an apparent uninterrupted movement of light across said light-emitting means, in either of two directions, the preselected direction of apparent light movement corresponding to that in which the vehicle turn, preindicated by the signal, is to be executed.

8. A signal for indicating a turning movement of a vehicle to the right or left, comprising a housing, embodying light-emitting means, said housing being adapted to be supported to render said light-emitting means observable from the road upon which vehicular traffic is operating, means for electrically illuminating said housing enclosed therein, and means associated with said illuminating means, selectively operable, to produce an apparent uninterrupted movement of light across said light-emitting means, parallel to the surface of the vehicle roadway, in either of two directions, the preselected direction of apparent light movement being to the right or left to correspond to the direction of the turn which is to be executed by the vehicle.

D McRA LIVINGSTON.